Dec. 12, 1933.  G. H. AMONSEN  1,938,573
CLUTCH
Filed May 8, 1931   2 Sheets-Sheet 1
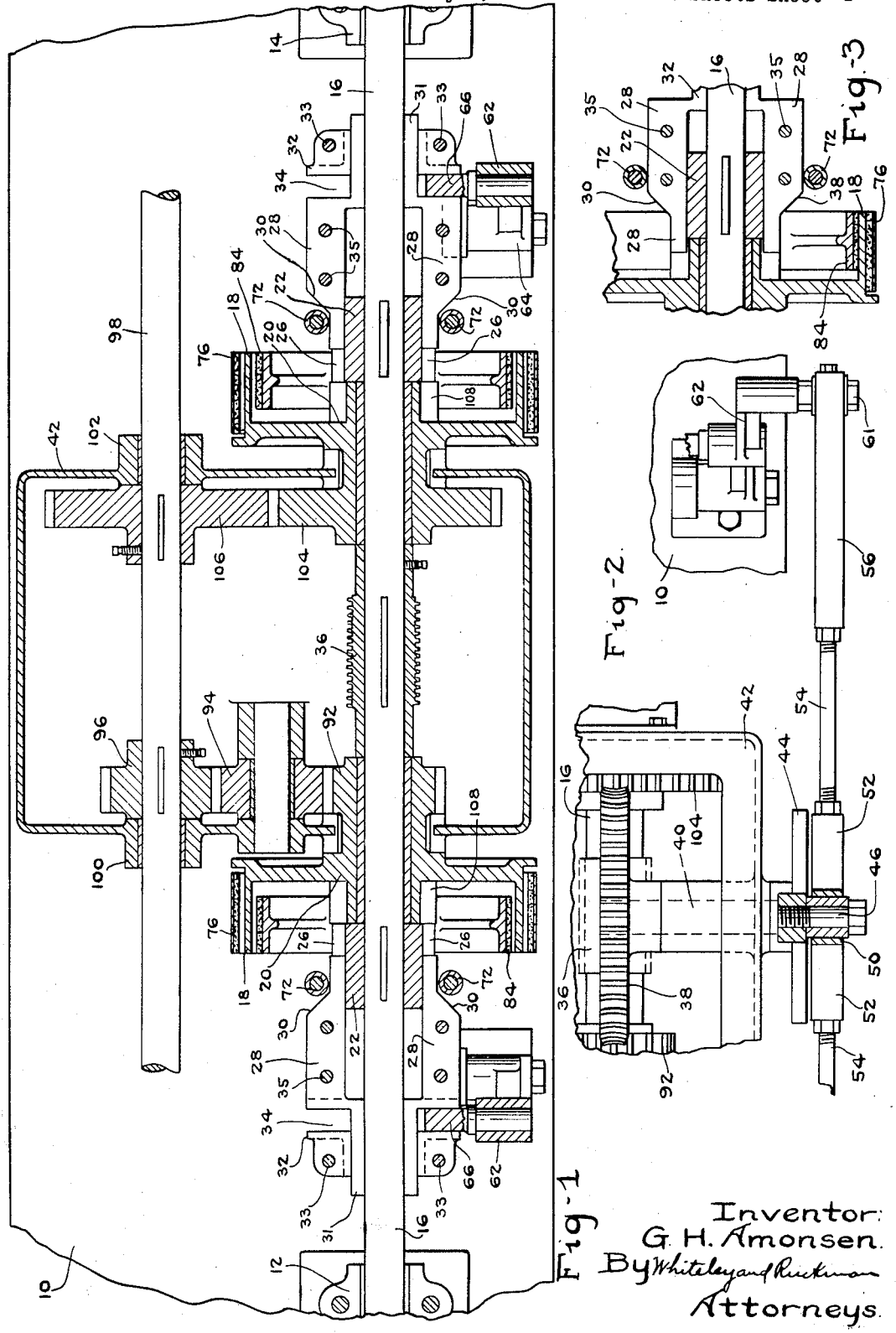
Inventor:
G. H. Amonsen.
By Whiteley and Ruckman
Attorneys.

Dec. 12, 1933.  G. H. AMONSEN  1,938,573
CLUTCH
Filed May 8, 1931   2 Sheets-Sheet 2
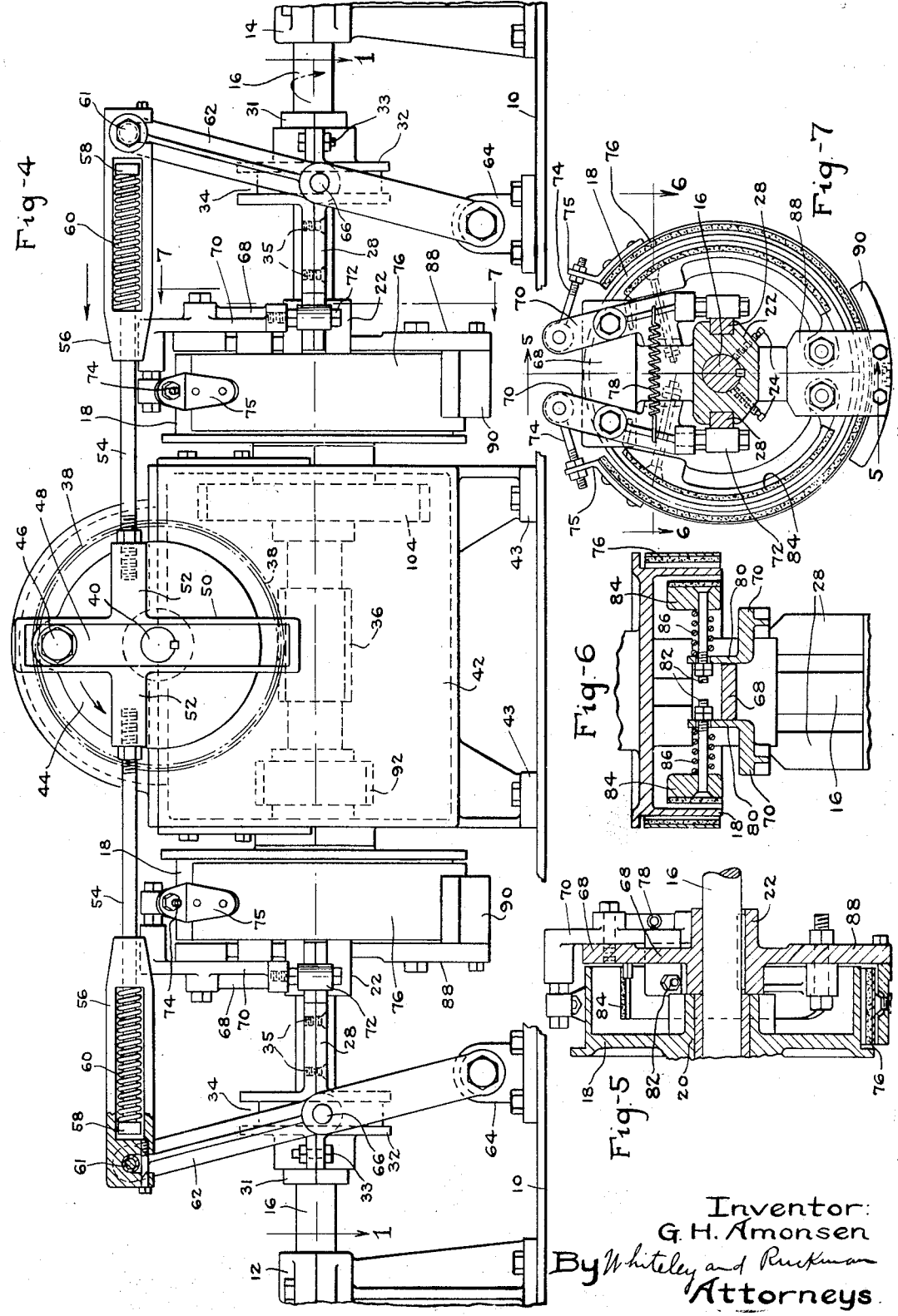
Inventor:
G. H. Amonsen
By Whiteley and Ruckman
Attorneys.

Patented Dec. 12, 1933

1,938,573

UNITED STATES PATENT OFFICE 1,938,573

CLUTCH

George H. Amonsen, Minneapolis, Minn.

Application May 8, 1931. Serial No. 535,923

3 Claims. (Cl. 192—73)

My invention relates to clutches. An object of the invention is to provide mechanism by means of which the motion of a shaft rotating continuously in one direction may be employed for imparting alternate forward and backward rotations to a driven member. Another object is to provide mechanism of this character in which the reversing mechanism may be readily disconnected so that the rotating shaft may be employed when desired for driving continuously in one direction. My device is intended to be operated by a light duty motor revolving continuously in one direction. This effects great economy in the cost of operation and a saving in belting, bearings and motor maintenance. My invention embodies an automatically reversing mechanism which may be employed for operating various machines such as laundry washing machines, dry-cleaning machines, creamery churns or other machines which alternately revolve forwardly and backwardly when in operation. Machines of this character now commonly in use and operated by individual motors, depend for the reversing movement upon the motor control so constructed as to reverse the movement of the motor, thus requiring a heavy duty motor and involving a wasteful expenditure of electrical energy.

The full objects and advantages of my invention will appear in connection with the detailed description thereof, and the novel features of my inventive idea will be particularly pointed out in the claims.

In the accompanying drawings which illustrate a practical embodiment of my invention,—

Fig. 1 is a view of the mechanism in horizontal section on the line 1—1 of Fig. 4. Fig. 2 is a top plan view of a portion of the mechanism. Fig. 3 is a fragmentary view corresponding to a portion of Fig. 1 and showing the clutched position of the parts of a clutch device. Fig. 4 is an elevational view of the mechanism. Fig. 5 is a view in section on the line 5—5 of Fig. 7. Fig. 6 is a view in section on the line 6—6 of Fig. 7. Fig. 7 is a view in section on the line 7—7 of Fig. 4.

Referring to the construction shown in the drawings, the numeral 10 designates a base plate which carries bearings 12 and 14 for a shaft 16 which is intended to be rotated continuously from any suitable source of power in the direction indicated by the arrow in Fig. 4. Two similar drums 18 are oppositely disposed in spaced relation to each other and are loosely mounted on the shaft 16 by means of hubs 20. Two collars 22 are keyed on the shaft 16 and as shown in Fig. 7 are adjustably held in longitudinal direction by set screws 24 so that these collars may be held snugly against the ends of the hubs 20. The collars 22 are angular in shape and at diametrically opposite places are provided with slideways 26. These slideways slidably receive pairs of jaws 28 having inclined surfaces 30. The pairs of jaws extend out longitudinally from slidable sleeve members 31 surrounding the shaft 16. Split collars 32 secured around the sleeves 31 by bolts 33 provide circumferential grooves 34 in connection with the outer ends of the jaws 28. These jaws and the sleeve members 31 by which they are carried are split and held together by screws 35. Upon taking out the bolts 33 and the screws 35, it is evident that the jaws, the sleeve members 31 and the collars 32 may be removed for a purpose which will appear later.

Between the two hubs 20 there is a worm 36 secured to the shaft 16 and meshing with a worm wheel 38 as best shown in Fig. 2. The worm wheel 38 is secured to a transverse shaft 40 mounted in bearings formed in a casing 42 secured to the plate 10 by feet 43 as shown in Fig. 4. Outside of the casing 42, a crank disk 44 is secured to the shaft 40. This crank disk carries a crank pin 46 which works in a vertical slot 48 formed in a crosslike member 50 having two arms 52 extending out in opposite directions and to which rods 54 are secured respectively. The rods 54 pass through the inner ends of connecting members 56 and at their outer ends, these rods are provided with enlargements 58. Coiled springs 60 surrounding the rods 54 are interposed between the enlargements 58 and the inner ends of the members 56. The outer ends of the members 56 are pivotally attached by removable pivots 61 to the upper ends of levers 62 whose lower ends are pivotally connected to ears 64 extending up from the plate 10. The levers 62 carry projections 66 which fit into the circumferential grooves 34 formed by the collars 32. It is apparent therefore that the levers 62 will be oscillated and will cause the pairs of jaws 28 to reciprocate. As shown in Figs. 5 and 7, the collars 22 are provided with outwardly extending arms 68 to which pairs of levers 70 are intermediately pivoted. The inner ends of these levers carry rollers 72 adapted to ride on the inclined surfaces 30 of the jaws 28. The outer ends of the levers 70 are connected by adjustable links 74 with ears 75 secured to the ends of external clutch bands 76, it being noted that the pairs of levers 70 are connected inwardly of their pivots by coiled springs 78 whereby the rollers 72 are kept in contact with the jaws 28. The clutch bands 76 will therefore be held out of engagement with the drums 18 when the rollers 72 are engaged with the low spots of the jaws.

The inner arms of the levers 70 are provided with offset members 80 as shown in Fig. 6. Bolts 82 pass loosely through apertures in the members 80 and the heads of these bolts are securely fastened to the respective ends of two internal clutch shoes 84. Coiled springs 86 surrounding the bolts 82 and interposed between the members 80 and the shoes 84 serve to resiliently hold the latter in engagement with the inner surfaces of the drums 18 when the rollers 72 are engaged with the high spots of the jaws. The collars 22 opposite the arms 68 are provided with outwardly extending arms 88 to which external curved members 90 are secured. When the bands 76 are released from the drums, said bands engage the members 90 so that dragging of the bands on the drums is prevented. The attached ends of the shoes 84 are pivoted to the arms 88. Referring to Fig. 1, it will be seen that a spur gear 92 is secured to the hub 20 of the left hand drum and this gear meshes with an idler gear 94 which in turn meshes with a spur gear 96 secured to a countershaft 98 mounted in bearings 100 and 102 carried by the casing 42. A spur gear 104 secured to the hub 20 of the right hand drum meshes directly with a spur gear 106 secured to the countershaft 98.

The operation and advantages of my invention will be readily understood in connection with the foregoing description. Rotation of the shaft 16 causes rotation of the transverse shaft 40 through the worm 36 and the worm gear 38 which constitute a reduction gearing. The crank pin 46 on the disk 44 will reciprocate the member 50 and also the oppositely extending rods 54. It will be understood that Figs. 1 and 4 represent the neutral position in which all of the rollers 72 rest upon the low spots of the jaws 28. Assuming that the shift is toward the left, the right hand lever 62 will be swung toward the left, thereby causing the right hand jaws 28 also to move toward the left so that the rollers 72 ride up on the inclined surfaces 30. This movement causes the external clutch band 76 to be contracted into engagement with the outer surface of the drum 18 and the internal clutch shoes 84 to be expanded into engagement with the inner surface of this drum. It will be noted that this action is resilient on account of the pull of the rod 54 being upon the spring 60. If there is any appreciable slipping of the bands on the drum so that the jaws tend to rotate faster than the drum, then the jaws under the tension of the spring 60 have a further forward movement so that their ends enter recesses 108 formed in the hub 20 as will be understood from Fig. 1. The drum is therefore first frictionally driven by the internal shoes and the external bands and finally is positively driven by the engagement of the jaws. Rotation of the right hand drum and the gear 104 will cause rotation of the shaft 98 in one direction. When the shift is toward the right, an action similar to that just described occurs with regard to the left hand drum so that the rotation of the gear 92 and idler 94 causes the shaft 98 to rotate in the opposite direction. It is to be noted that the internal clutch shoes act as brakes to stop the rotation of the drums and also function to start the drums before the external clutch bands take hold. The internal clutch shoes also function to prevent the jaws from engaging too suddenly. Due to the fact that the jaws 28, the sleeve members 31 and the collars 32 are split and detachably held together, they may be removed to permit ready relining of the internal clutch shoes. It is therefore not necessary to remove the shaft 16 or the bearings thereof to perform this operation. If it is desired to drive a device continuously in one direction, then the pivots 61 are removed, while in case the mechanism is connected to a motor drive, the motor may be used for other purposes when the clutches are set in the neutral position shown in Figs. 1 and 4.

I claim:

1. A clutch comprising a drum loosely mounted on a shaft, a support secured to said shaft adjacent said drum, two levers intermediately pivoted to said support, an external clutch band for said drum pivotally attached at its terminals to the outer ends of said levers respectively, an internal clutch shoe for said drum, springs interposed between the inner arms of said levers and the terminals of said shoe, and means for actuating said levers.

2. A clutch comprising a drum loosely mounted on a shaft, a support secured to said shaft adjacent said drum, two levers intermediately pivoted to said support, an external clutch band for said drum pivotally attached at its terminals to the outer ends of said levers respectively, an internal clutch shoe for said drum, offset members on the inner arm of said levers, bolts passing loosely through said offset members and having their outer ends secured to the terminals of said shoe, springs surrounding said bolts between said terminals and said offset members, and means for actuating said levers.

3. A clutch comprising a drum loosely mounted on a shaft, a support secured to said shaft adjacent said drum, two levers intermediately pivoted to said support, an external clutch band for said drum pivotally attached at its terminals to the outer ends of said levers respectively, an internal clutch shoe for said drum, springs interposed between the inner arms of said levers and the terminals of said shoe, a sleeve slidably carried by said shaft, jaws carried by said sleeve, said jaws having inclined surfaces which engage the inner ends of said levers to bring said band and shoe into clutching engagement with said drum before the ends of said jaws engage said drum, and means for actuating said sleeve.

GEORGE H. AMONSEN.